US006193871B1

(12) United States Patent
Coates et al.

(10) Patent No.: US 6,193,871 B1
(45) Date of Patent: Feb. 27, 2001

(54) PROCESS OF FORMING A NICKEL ELECTRODE

(75) Inventors: Dwaine K. Coates, Joplin, MO (US); Dennis Chiappetti, Pittsburgh, KS (US)

(73) Assignee: Eagle-Picher Industries, Inc., Cincinnati, OH (US)

( * ) Notice: Subject to any disclaimer, the term of this patent is extended or adjusted under 35 U.S.C. 154(b) by 0 days.

(21) Appl. No.: 09/208,132

(22) Filed: Dec. 9, 1998

(51) Int. Cl.$^7$ .............................. C25D 5/10; C25D 5/12
(52) U.S. Cl. ...................... 205/170; 205/177; 205/181
(58) Field of Search .................. 205/177, 181, 205/199, 170, 200, 201, 219, 229; 427/435, 439, 443.2, 299, 322, 327

(56) References Cited

U.S. PATENT DOCUMENTS

| | | | |
|---|---|---|---|
| 3,979,223 | 9/1976 | Kroger et al. ........................ 204/24 |
| 3,985,504 | * 10/1976 | Kindscher et al. ................. 21/2.7 R |
| 4,132,606 | 1/1979 | Crespy et al. ....................... 204/2.1 |
| 4,370,395 | 1/1983 | Nagaura et al. ..................... 429/219 |
| 4,399,005 | * 8/1983 | Fritts et al. ......................... 204/2.1 |
| 4,985,318 | 1/1991 | Oshitani et al. .................... 429/223 |
| 5,391,265 | 2/1995 | Krynitz et al. ....................... 204/96 |
| 5,451,475 | 9/1995 | Ohta et al. .......................... 429/212 |
| 5,466,546 | 11/1995 | Pensabene et al. ................. 429/223 |
| 5,508,121 | 4/1996 | Sawa ..................................... 429/59 |
| 5,567,549 | 10/1996 | Ovshinsky et al. ................. 429/223 |
| 5,569,444 | 10/1996 | Blanchard et al. .................. 423/594 |
| 5,569,563 | 10/1996 | Ovshinsky et al. ................. 429/223 |
| 5,571,636 | 11/1996 | Ohta et al. .......................... 429/218 |
| 5,637,473 | 6/1997 | Ovshinsky et al. ................. 429/223 |
| 5,660,709 | * 8/1997 | Bauer et al. ........................ 205/344 |
| 5,670,271 | 9/1997 | Axmann ............................... 429/59 |

FOREIGN PATENT DOCUMENTS 62-71168 * 4/1987 (JP) .

OTHER PUBLICATIONS

Dennis A. Corrigan and Richard M. Bendert, *Effect of Coprecipitated Metal Ions on the Electrochemistry of Nickel Hydroxide Thin Films: Cyclic Voltammetry in 1M KOH*, J. Electrochem. Soc., vol. 136, No. 3, Mar. 1989 ©The Electrochemical Society, Inc. (pp. 723–728).

* cited by examiner

*Primary Examiner*—Edna Wong
(74) *Attorney, Agent, or Firm*—Wood, Herron & Evans

(57) ABSTRACT

A nickel electrode prepared by depositing one of an oxide and hydroxide of a zinc-salt to an electrode substrate in a first step and, thereafter, depositing nickel-active material to the electrode substrate in a separate step.

12 Claims, No Drawings

PROCESS OF FORMING A NICKEL ELECTRODE

FIELD OF THE INVENTION

This invention relates to electrodes. More specifically, this invention relates to a process of forming a nickel electrode by a discrete two step metal deposition process.

BACKGROUND OF THE INVENTION

A nickel electrode consists of basically two parts, an electrochemically active material and an electrochemically inactive electrode substrate. The active material consists of various types and phases of nickel-oxide and/or nickel-hydroxide. The active material traditionally contains cobalt-oxide and/or cobalt-hydroxide as a performance enhancing additive.

The electrode substrate consists of a variety of materials and structures, including sintered nickel powder, nickel fibers, nickel foam or various forms of carbon and combinations of the aforementioned materials.

The active material undergoes reversible electrochemical reactions and imparts electrochemical energy storage properties to the electrode, and therefore the battery. The active material is amorphous and has no structural properties in and of itself. The electrode substrate provides mechanical support to the active material and also provides electrical conduction to the active material. The electrode substrate is electrochemically inert (other than corrosion), and provides no energy storage to the electrode. The electrode substrate is typically microporous and has a high surface area to maximize the active material/substrate interface. The active material typically exists within the micropores of the substrate.

A traditional nickel electrode swells in thickness primarily because of forces exerted on the metallic substrate by the active material. Nickel-hydroxide exists in multiple phases, degrees of hydration and oxidation states. In the generally accepted reaction scheme α-phase nickel-hydroxide (α-Ni(OH)$_2$), is deposited in the electrochemical process. This material ages to β-phase nickel-hydroxide (β-Ni(OH)$_2$) in aqueous potassium-hydroxide (KOH), by what is principally a dehydration process. The primary reaction pathway in a nickel electrode is the oxidation and reduction of β-phase nickel-hydroxide between the charged (β-NiOOH) and discharged (β-Ni(OH)$_2$) states. If β-NiOOH is charged further it can be converted to a γ-phase nickel-hydroxide (γ-NiOOH). The discharge of γ-NiOOH yields α-Ni(OH)$_2$. The active material undergoes a number of structural, textural and density changes.

The structure of α-Ni(OH)$_2$ is described as turbostratic brucite-type layers with a random orientation along the c-axis. Water (H$_2$O), molecules and anions (primarily nitrate (NO$_3^{2-}$)) from the impregnation bath are dispersed in the interlamellar spaces. The material has a density of approximately 2.5 grams per cubic centimeter (g/cc) and a water content of approximately 0.67 moles of H$_2$O per mole of α-Ni(OH)$_2$. The interlamellar distance is approximately 8.2 Å. β-Ni(OH)$_2$ is isomorphous with brucite Mg(OH)$_2$ and is a more ordered structure than the α-phase material. β-Ni(OH)$_2$ has a density of approximately 4.15 g/cc (a lower value of 3.3 g/cc has been reported based on in situ measurements) and a water content of approximately 0.25 moles of H$_2$O per mole of β-Ni(OH)$_2$. The interlamellar distance is approximately 4.6 Å. The charged form (oxidized β-Ni(OH)$_2$) of the active material is usually referred to as β-NiOOH indicating a one electron change. β-NiOOH has a structure very similar to β-Ni(OH)$_2$ with a density of 4.68 g/cc (3.8 g/cc in situ) and a water content of 0.22. The interlamellar distance is approximately 4.6 Å.

The oxidation of β-Ni(OH)$_2$ to β-NiOOH is a smooth transition resulting in very little disruption of the crystal structure. The state of hydration of the charged and discharged forms is very similar. The change in density amounts to about 12.7% with virtually no expansion of the interlamellar spacing in the lattice. The transition from β-NiOOH to γ-NiOOH, on the other hand, is quite distinct. γ-NiOOH has a density of approximately 3.79 g/cc and a water content of 0.35. This corresponds to a 21% decrease in the material density. The decrease in density corresponds to an increase in the volume of the material. The interlamellar spacing of the brucite layers in γ-NiOOH is approximately 7 Å, corresponding to a 49% expansion of the lattice. This expansion is attributed to the incorporation of potassium ions (K$^+$) and water into the interlamellar spaces.

The relatively large change in density that occurs in the β-NiOOH to γ-NiOOH transition is, to a great extent, responsible for the swelling observed in the electrode. Therefore, an additive which inhibited the formation of γ-NiOOH would serve to reduce swelling in the electrode.

Cadmium has traditionally been used in the nickel electrode as an additive to reduce electrode polarization and swelling. Cadmium has been found to be the most effective additive to prevent swelling in the nickel electrode, particularly when used in conjunction with cobalt. It is believed that cadmium-hydroxide (Cd(OH)$_2$) inhibits the formation of γ-NI(OOH) and therefore reduces electrode swelling. It is further believed that Cd(OH)$_2$ also increases the oxygen overvoltage of the nickel electrode, thus improving charge efficiency.

Cadmium is typically used in the nickel electrode as an additive at the level of less than 5%. Also, when cobalt is used as an additive alone, nickel electrode swelling increases. Also, zinc and magnesium additives are equally effective in preventing swelling but the addition of calcium increases electrode swelling. This is attributed to the large ionic radii of the calcium cation. There is also strong evidence of a quantitative relationship between electrode swelling and the density changes that occur in the active material when charging and discharging. This is most pronounced for the formation of low density γ-phase active material.

Cadmium, however, is environmentally undesirable. Cadmium, as an additive to the nickel electrode, does not have any additional environmental impact in a nickel-cadmium cell because of the presence of a large amount of cadmium in the negative electrode. Any small amount of cadmium in the nickel electrode is relatively insignificant. However, in nickel-zinc, nickel-iron, nickel-metal hydride, nickel-hydrogen or other alkaline rechargeable batteries, even a very small amount of cadmium in the cell has a significant environmental impact. Therefore, a replacement additive was sought which would provide the benefits of cadmium without the undesirable environmental effects. A number of materials have been investigated and several have shown some utility as a performance enhancement additive in the nickel electrode. For example, the effect of cadmium, cobalt, zinc, lead, silver, manganese, cerium, chromium, copper, magnesium, lanthanum, and yttrium has been investigated. Various manganese compounds have been proposed as an additive, as disclosed in U.S. Pat. No. 5,508,121. A considerable amount of work has focused on zinc as the most promising nickel electrode additive as disclosed in U.S. Pat. Nos. 5,549,992; 5,506,070; 5,348,822; 5,523,182; 5,498,403; 5,077,149; 4,844,999; and 4,985,318. This is contrary to early work, associated with the nickel-zinc battery, which postulated that zinc acted as a poison to the nickel electrode reducing both the capacity and cycle life. Other work has suggested that binary, e.g., zinc in combination with manganese, and ternary, e.g., zinc, manganese and iron, additive mixtures can further improve the performance of the nickel-hydroxide electrode. Other nickel electrode additives have been suggested in relation to the overall structure of the active material oriented towards the goal of multiple electron transfer in the nickel electrode reactions.

Concurrent deposition of zinc-hydroxide in a thin film of nickel-hydroxide on a platinum electrode has been investigated by cyclic voltammetry. Theoretical study on thin film materials has not addressed any issues regarding the fabrication of practical battery electrodes. Nickel and cobalt hydroxides have been chemically deposited as a very thin film on a platinum wire in order to study the fundamental properties of the materials. Electrochemical deposition has not been addressed. Prior proposed use of up to 20% zinc-hydroxide by weight is impractical from a battery application viewpoint. It is believed that zinc both inhibits the formation of $\gamma$-NiOOH and raises the potential of the oxygen evolution reaction, improving the charge efficiency of the electrode and reducing electrode swelling.

U.S. Pat. No. 4,399,005, describes a process for the concurrent electrochemical deposition of zinc and nickel-hydroxide into the nickel electrode. This concept was developed for the alcohol-based impregnation process. The patent points out that zinc is commonly used as an additive to the pasted-type nickel electrode to improve dimensional stability. The patent goes on to describe a process whereby zinc can be deposited concurrently with nickel-hydroxide by an electrochemical process in which the zinc-nitrate is continuously added to the electrochemical bath during the process.

The nickel electrode is often the performance and life limiting component in a sealed, electrolyte-starved alkaline rechargeable battery. The primary long-term failure mechanism is nickel electrode swelling which results in dry-out of the separators in the electrode stack. As the nickel electrode expands in thickness, its internal volume and porosity increase. This nickel electrode expansion is a macroscopic manifestation of the density and volume changes that occur at the atomic level within the lattice structure of the active material. The microporous structure of the nickel electrode wicks electrolyte from the separator through capillary action and mass transport, causing the separator to contain less electrolyte. This increases the internal impedance of the cell, reducing cell capacity. The loss in cell capacity results in downward spiral in cell performance until failure is reached. This situation is particularly acute in sealed cells which operate in an electrolyte-starved condition for gas management purposes. The situation is also compounded by flat-plate electrode stack construction such as is used in prismatic cells or cylindrical nickel-hydrogen cells. This situation is further compounded in the nickel hydrogen battery cell because the electrode stack is suspended within the pressure vessel cell container such that there is no physical contact between the electrode stack and the cell container wall. Electrolyte lost from the electrode stack is not easily reclaimed. The three-phase reaction of hydrogen on the catalytic anode during discharge requires that the nickel-hydrogen cell operate in an extremely electrolyte-starved condition. This makes this type of cell even more susceptible to swelling of the nickel electrode and the resulting electrode stack dry-out.

A. Electrochemical Impregnation Process

Basic nickel electrode technology in use today, including a rudimentary electrochemical impregnation process, dates back to Thomas Edison, U.S. Pat. No. 1,402,751. Electrochemical impregnation technology has evolved through a series of steps including British Patent No. 917,291, and U.S. Pat. Nos. 3,214,355; 3,282,808; 3,466,231; and 3,653,967.

An electrochemical process was described in U.S. Pat. No. 3,979,223, which deposited nickel-hydroxide concurrently with cobalt-hydroxide within a porous nickel electrode substrate. This process used a consumable anode in the impregnation bath which consisted of an alloy containing the correct proportion of metallic nickel and cobalt.

Traditionally, a chemical deposition process has been used for the impregnation of the active material. This involves soaking the plaque in nickel-nitrate solution followed by cathodic polarization in aqueous potassium-hydroxide. Along with the handling, rinsing, drying, etc., this is a very inefficient multi-step process. In addition, as many as eight or ten repetitive soakings in nickel-nitrate may be required to achieve adequate active material loading. The process is very time consuming, corrodes the plaque in the nitrate solution and surface loads the plaque. The outer pores become plugged such that the interior of the plaque is not impregnated with active material. This leads to non-uniform active material loading and subsequently poor electrochemical utilization and inadequate performance and cycle life.

The vacuum chemical impregnation process is a refinement which improves the active material distribution through the cross-section of the electrode. In this process, the chemical impregnation is done under vacuum. The vacuum removes the air from the pores of the electrode substrate allowing the nitrate solution to more easily penetrate into the interior of the porous structure. More active material is deposited deeper into the electrode structure than with the standard chemical impregnation process. This improves the active material distribution and utilization. However, this does not reduce corrosion of the electrode substrate or reduce the number of multiple impregnation steps required to achieve adequate weight pickup. The electrochemical impregnation process was thereafter developed to address these problems.

The electrochemical impregnation process produces nickel electrodes which have higher specific energy, increased active material utilization and reduced corrosion and swelling. The electrochemical impregnation process deposits nickel-hydroxide active material inside the pores of the electrode substrate by means of a nitrate reduction reaction. This process is shown in Reactions (1)–(4).

$$NO_3 + 6\ H_2O + 8e \rightarrow NH_3 + 9\ OH \quad (1)$$

$$NH_3 + H_2O \rightarrow NH_4^+ + OH \quad (2)$$

$$Ni^{2+} + 2\ OH \rightarrow Ni(OH)_2 \quad (3)$$

$$Co^{2+} + 2\ OH \rightarrow Co(OH)_2 \quad (4)$$

Nitrate is electrochemically reduced to ammonia (Reaction (1)) at the electrode/electrolyte interfacial surface within the porous structure of the electrode substrate. The production of hydroxyl ions (Reactions (1) and (2)) causes a change in the local pH inside the pores of the electrode, increasing the alkalinity and causing the chemical precipitation of nickel-hydroxide (Reaction (3)). Cobalt-hydroxide is typically deposited concurrently during the process (Reaction (4)). The level of cobalt-hydroxide in the finished electrode is controlled by adjusting the concentration of ionic cobalt in the impregnation bath as further discussed below in Section B.

The nickel-hydroxide is deposited on the electrode substrate surface within the porous structure. The active material, as deposited by the electrochemical process, is primarily a hydrated a-phase nickel-hydroxide. This material then ages to the β-phase nickel-hydroxide active material in the presence of the alkaline electrolyte. The nickel-hydroxide is deposited on the surface of the electrode in a thin, uniform layer.

There are three advantages of the electrochemical process over the chemical deposition process. First, corrosion of the electrode substrate is greatly diminished because the material is cathodically protected while in contact with the corrosive nitrate bath. Second, adequate active material loading can be accomplished in a single impregnation step, which greatly reduces the time and cost associated with electrode manufacturing. Third, the utilization of the active material is significantly higher when compared with other types of nickel electrode fabrication methods, primarily due to the more intimate contact between the active material and substrate that is attainable with the electrochemical impregnation method. Also, the electrochemical process allows the use of an electrode substrate which has a smaller pore size and a higher surface area. This process increases active material/substrate interfacial surface area, and improved electrolyte contact, which reduces electrode polarization and impedance. The nickel-hydroxide deposited by the chemical and electrochemical processes have different crystal structures and differing states of hydration. This may account, in part, for the differences in properties observed between chemically and electrochemically prepared nickel electrodes.

B. Electrochemically Co-deposited Additives

Cobalt-hydroxide is typically co-deposited from the ionic species in the impregnation bath in the electrochemical impregnation process. Cobalt is also used as an additive in most types of commercial nickel electrodes including chemically impregnated and pasted electrodes. Commercial battery-grade nickel-hydroxide typically contains cobalt-hydroxide additive as manufactured.

Cobalt-hydroxide is commonly used in nickel electrodes for most aerospace and commercial applications. Various claims concerning the beneficial effects of cobalt include: (a) lowered median oxidation potential on charge and raised oxygen evolution voltage, which results in an increase of the difference between the charge voltage and oxygen evolution voltage, resulting in higher charge efficiency; (b) improved proton conductivity of nickel-hydroxide resulting in a lower oxidation potential; (c) decreased proton diffusion resistance and charge transfer resistance; (d) relief of internal stresses in the electrode and reduced morphological changes which degrade capacity; (e) decreased electrode polarization and impedance resulting from cobalt-hydroxide being much higher in conductivity than nickel-hydroxide; (f) cobalt complex ions form a solid solution with nickel hydroxides; and (g) arguably reduced electrode swelling since cobalt-hydroxide is effective in preventing the formation of γ-Ni (OOH).

OBJECTIVES OF THE INVENTION

It is therefore an objective of the present invention to provide an electrochemical deposition process of pre-depositing performance-enhancing additives into an electrode substrate in which a high surface area, thin-film structure of the additive material is achieved.

It is a further objective of the invention to provide an electrochemical deposition process of introducing performance-enhancing additives by which an improved aerospace quality nickel electrode, with enhanced dimensional stability and increased energy storage capacity per unit weight, can be produced.

It is another objective of the invention to provide an aerospace quality nickel electrode with improved electrochemical utilization of the active material.

It is also an objective of the invention to provide an aerospace quality nickel electrode with enhanced dimensional stability and a reduced tendency towards swelling in thickness.

SUMMARY OF THE INVENTION

In order to achieve these objectives, an electrochemical impregnation process has been devised in which a nickel electrode substrate is electrochemically impregnated with performance-enhancing metal additives, e.g., zinc-hydroxide, zinc-oxide, mixtures of zinc additives and other metal-oxides and metal-hydroxides, in a first step, prior to standard impregnation of nickel-active material in a separate second step.

The current invention provides for the separate pre-deposition of electrode metal additives in a first step prior to the introduction of the nickel active material in a second step. An electrode substrate is cathodically polarized in order to induce the deposition of the performance-enhancing additive metal ions present in the first step. Suitable electrode substrates include sintered nickel powder, nickel fiber, nickel foam, graphite fiber, composite carbon materials, metal coated graphite fibers or metal coated polymer fibers. Separate pre-deposition of the metal additive has several basic advantages over the concurrent deposition method of incorporating additives. In the process of the invention, the metal additive is electrochemically deposited from aqueous solution without the interference of nickel, cobalt or other ions and competing reactions. This allows precise control in the quantity and structure of the additive deposited, and the deposition of a high surface area, thin-film structure of the metal additives on the electrode substrate without the interference of competing ions. This cannot be achieved by a co-deposition process where multiple active material ions are present in solution and are simultaneously co-precipitated with the metal additive. The metallic additive species ultimately become intimately mixed, at the atomic level, into the bulk of the active material matrix. The thin-film structure thus formed during this separate step allows for the full realization of the performance enhancing properties of the additive. This provides superior benefits as compared to commercial pasted electrodes in which the additive species are simply mechanically mixed with the active materials. In one embodiment, multiple additive materials can be simultaneously or stepwise added to the electrode substrate.

Metal cation additives deposited on the electrode substrate in the first step are covered by the layer of nickel-active material deposited thereafter, in the second step. The nickel-active material layer protects the additive layer from dissolution when the electrode is subsequently charge/discharge cycled in alkaline electrolyte such as potassium-hydroxide. Other cation oxides and hydroxides, particularly those of zinc, are more soluble than the nickel-active material in the alkaline electrolyte.

In the co-deposition additive process, these soluble additive species are present at the surface of the active material/ electrolyte interface where they can be dissolved into the bulk electrolyte. This results in the loss of additive material from the electrode, contamination of the electrolyte with the additive species and a subsequent reduction in electrode and battery performance. The pre-deposition method of the present invention avoids this problem.

The present inventive process allows for the precise electrochemical deposition of a high surface area, thin-film structure of performance-enhancing additives to the nickel electrode.

The nickel electrode product of the process will allow for manufacture of aerospace quality nickel-hydrogen batteries and also be applicable to a wide variety of alkaline battery chemistries which can be used for an equally wide variety of applications.

Other advantages of the invention will become apparent to those of ordinary skill upon review of the following detailed description of the preferred embodiment.

DETAILED DESCRIPTION OF THE INVENTION

An electrochemical impregnation process has been devised in which a nickel electrode substrate is electrochemically impregnated with one of a metal-oxide and metal-hydroxide performance enhancing additive in an initial step and, thereafter, a nickel-active material is electrochemically deposited in a second, separate step.

As will be understood by those skilled in the art, suitable electrode substrates include sintered nickel powder, nickel fiber, nickel foam, graphite fiber, composite carbon materials, metal coated graphite fibers or metal coated polymer fibers.

An aqueous bath of a suitable salt of the metallic additive, i.e., the nitrate or sulfate, is used for the first electrochemical deposition step. Metallic performance enhancing additives include, for example, zinc, silver, cobalt, manganese or magnesium, and combinations thereof. The electrode substrate is cathodically polarized in order to induce the deposition of the oxides and/or hydroxides of the additive metal ions present. The deposition of the metal additive forms a thin uniform layer onto the substrate. The relatively small percentage of the additive ions, in relation to the bulk nickel-hydroxide active material subsequently deposited, acts as a dopant within the lattice structure of the nickel-hydroxide active material.

The additives zinc-hydroxide ($Zn(OH)_2$), zinc-oxide (ZnO) and mixtures thereof reduce swelling in the nickel electrode for pasted and plastic-bonded electrodes. If zinc cations are present in an aqueous impregnation bath during the first step of the nitrate reduction process, Reactions (1) and/or (2), as seen below, will occur. It is understood by those skilled in the art that other metallic cations can be substituted for zinc in these reactions. These metallic species include cobalt, magnesium, manganese, silver, combinations thereof and/or other metallic species additive can also be co-deposited with zinc additive. A generic reaction is indicated in Reaction (3), where M represents a metallic cation of oxidation state x. It is also understood that multiple reactions could occur simultaneously in the impregnation additive bath.

  (1)

  (2)

  (3)

The result from Reactions (1) and (2) is that zinc-oxide and/or zinc-hydroxide will precipitate within the micropores of the porous electrode substrate. The quantity of zinc material deposited on the electrode substrate can be precisely controlled through manipulation of process parameters such as the concentration of zinc ions in solution and the current density at which the process is carried out. The relatively small percentage of zinc-oxide and/or zinc hydroxide deposited will form a solid solution in the bulk active material (primarily nickel-hydroxide/nickel-oxide/ nickel-oxyhydroxide). Zinc cations act as a dopant or defect within the existing bulk active material lattice. This effect increases the conductivity, increases the electrochemical utilization, reduces the polarization and reduces the lattice expansion of the active material and reduces the swelling of the electrode.

The electrode substrate is thereafter electrochemically impregnated by a second reduction step as follows.

  (4)

  (5)

  (6)

The conductivity of the various phases of nickel-hydroxide are as follows:

$\gamma$-NiOOH is a much poorer conductor than $\beta$-NiOOH but both are more electronically conductive than the discharged material ($\beta$-Ni(OH)$_2$). $\gamma$-NiOOH discharges at a slightly lower potential than $\beta$-NiOOH (approximately 50–70 millivolts). The conversion of $\beta$-NiOOH to $\gamma$-NiOOH results in increased electrode impedance, increased electrode polarization and a slightly reduced discharge output voltage. Additives such as cobalt, zinc, magnesium, manganese and silver inhibit the formation of $\gamma$-NiOOH, and thus improve electrode conductivity. This results in increased electrochemical utilization of the active material and reduced polarization. In addition, these foreign ions act as defects in the lattice also improving the electronic conductivity of both $\beta$-Ni(OH)$_2$ and $\beta$-NiOOH. $\gamma$-NiOOH is electrochemically reduced to a low density $\alpha$-Ni(OH)$_2$ which causes electrode swelling. Therefore, a reduction in the formation of $\gamma$-NiOOH will result in improved electrode dimensional stability.

Precise control of the additive species pre-deposition impregnation process parameters are required to achieve a high surface area, thin uniform layer of material and subsequent optimum results in the electrode and the battery. These parameters include the chemical concentration of all additive species in the impregnation bath, the current density at which the pre-deposition process is performed, the temperature of the impregnation bath, the ratio of the volume of impregnation solution to the bulk of electrode substrate present in the bath, the flow and/or agitation of the impregnation bath during processing, the elapsed time that pre-deposition is allowed to occur and the pH of the impregnation bath. Strict control of the process solution pH is required throughout the impregnation process. If the solution is too acidic, pre-deposition will not occur and excessive corrosion of the electrode substrate may result. If the solution is too alkaline, excessive surface loading may occur which results in the plugging of the surface pores of the porous electrode substrate material. Generally a pH of 1.8 to 2.2 is preferred. The solution must be buffered by the addition of a suitable oxidizable salt which can be consumed at the anode and which can buffer the pH of the solution. Examples of such salts are potassium-nitrite and sodium-nitrite, but it will be understood by those in the art that other suitable salts may be used as buffers. This is a critical step and must be carefully designed and executed due to the microporous structure and morphology of the electrode substrate.

Surface deposition prevents the penetration of fresh solution into the interior of the substrate such that the substrate is not adequately impregnated, so, flow and agitation of the impregnation solution is also important. If inadequate fresh solution is delivered to the electrode substrate during the process, local depletion of the co-depositing ionic species may occur. The flow of acidic solution past the surface of the substrate also serves to continually wash the surface, preventing the deposition of material on the surface which would cause plugging of the surface pores.

Process current density is also important. The passage of a fixed quantity of current is required to pre-deposit a certain amount of material in accordance with Coulomb's Law. It is desirable to perform the impregnation process in the least amount of time possible to reduce time, energy usage and cost. Therefore it is desired to use as high a current density as possible. However, if the current density is too high the pre-deposition reaction may be driven beyond the ability of the solution to replace itself within the pores of the substrate. This will result in the local depletion of reacting ionic species within the porous substrate. A significant concentration gradient results in a concentration polarization potential which opposes the pre-deposition process, resulting in greatly diminished efficiency and reduced active material loading. Excess current density also tends to cause surface loading of the substrate. It becomes thermodynamically favored for the pre-deposition process to occur at the surface of the electrode rather than within the pores. Optimum current density is necessary to obtain the uniform thin-film structure of the metallic additive species which provides optimum performance in the nickel electrode.

In the most preferred embodiment of the invention, a standard sintered nickel powder electrode substrate is prepared by the slurry method. Commercially available carbonyl nickel powder is combined in aqueous suspension with carboxymethylcellulose and polyethylene oxide. This slurry is formed into a sheet with a nickel wire mesh included as a mechanical support. The substrate precursor sheet material is sintered under a reducing atmosphere. This substrate has a nominal thickness of about 0.070–0.090 centimeters and a nominal bulk porosity of about 80% to 84%. The material has a typical average pore size of about 10–12 microns. An electrode substrate from the above material with an approximate area of about 175 square centimeters is prepared, although it will be understood that the process can be easily scaled to any production volume. An electrical attachment tab is resistance welded to a die-coined area of the electrode substrate. The electrode substrate assembly thus formed is subjected to the electrochemical impregnation procedure.

The electrode substrate is placed into a small stainless steel tank, vertically arranged mid-way between two platinized titanium counter-electrodes. The electrode substrate and the counter-electrodes are connected to an electrical power supply. The electrode substrate is cathodically polarized with a relatively small DC current of about 0.09 to 0.4 amperes (0.0005 to 0.002 amperes per square centimeter) and the pre-deposition zinc additive bath is introduced into the beaker. The pre-deposition zinc additive bath consists of about 0.04 to 0.10 molar solution zinc-nitrate. The small polarizing current is initially applied before the introduction of the nitrate bath to prevent corrosion from occurring on the electrode substrate.

The additive bath is pre-heated to a temperature of about 80–95° C. The additive impregnation process is carried out on a hotplate to maintain the bath temperature above 90° throughout the entire procedure. When the solution level in the tank completely covers the electrode substrate, a full polarizing current is applied. The electrode substrate is electrochemically impregnated with the zinc additive at a constant DC current of about 0.9 to 4.0 amperes (0.005 to 0.02 amperes per square centimeter for about sixty (60) minutes. The solution is agitated during the entire procedure. The impregnation bath solution is pH buffered with the addition of about a 3.0 molar sodium nitrite solution. Upon completion of the time period, the current is reduced and the electrode substrate is removed from the tank.

The electrode is rinsed with deionized water to remove excess nitrate solution. The sample is dried in a forced air oven at about 60° C. The electrode is weighed to determined the weight gain of zinc additive material deposited during the impregnation process. This weight gain is the zinc additive loading achieved during the impregnation process. This value is typically expressed as the number of grams of active material per cubic centimeter of electrode substrate void volume (g/ccvv). Preferably the zinc loading will be 1–5% of the active material by weight. It will be understood by those skilled in the art that multiple steps can be performed and the process conditions, e.g., time, current, solution pH and solution concentration, can be varied to achieve the precise weight gain of additive material desired.

Once the thin film of the zinc additive with the desired properties is obtained, the electrode is then subjected to the second depositing step in which the nickel-hydroxide active material is electrochemically deposited over the existing layer of zinc additive. This initially forms a discrete two-layer deposit of nickel-hydroxide over the existing zinc additive. As the electrode is subsequently formed and electrically charge/discharge cycled in potassium-hydroxide, the zinc additive diffuses into the nickel-hydroxide structure to form the desired solid solution. This occurs partly through the simple act of diffusion and is also driven by the electrochemical oxidation and reduction that occurs during charge and discharge of the electrode. The zinc additive has inherently higher mobility in alkaline solution than nickel-oxides and nickel-hydroxides. This is partially due to the higher solubility of the zinc materials in alkaline solution as compared to the analogous nickel materials. Zinc ions will be intimately incorporated into the lattice structure of the nickel-based active materials to deliver the desired performance enhancements as described above.

An alkaline formation step may be performed by charge/discharge cycling (current density about .036–.072 Amp/$cm^2$) the electrode substrate in aqueous potassium hydroxide (26–31% by weight). The stoichiometry, structure, thickness and uniformity of the resulting deposit is determined by controlling the process variables as described above. Current density, solution composition and pH are of primary importance with other variables also being important. The thickness and uniformity of the deposit is measurable by scanning electron microscope; the resultant electrodes can be cross-sectioned and analyzed; and the structure of the deposit can be determined by x-ray diffraction. After the zinc additive has been electrochemically deposited into the electrode substrate, the nickel-hydroxide bulk active material is then deposited as in the normal aqueous electrochemical impregnation process. Generally 40–60% of the weight of the electrode will be active electrode material. The resultant electrode will have benefit of the invention through the formation of a solid solution of the pre-deposited additives in the active material during the subsequent alkaline charge/discharge formation process and electrical cycling.

EXAMPLE

The table below consists of summary data comparing an electrode sample prepared by the current invention (Column C), to an electrode sample prepared by a prior art aerospace impregnation method (Column A), and an electrode sample prepared by a prior art co-deposition (Column B), Column B being similar to U.S. Pat. No. 4,399,005.

The sample of Column A consists of an aerospace quality electrode prepared by traditional aqueous electrochemical impregnation methods. This sample contains none of the performance enhancing zinc additive as in the present invention. Column B was prepared as Column A, with the exception that the zinc additive was deposited simultaneously and concurrently from the same solution with the nickel active material. Column C was prepared according to the present invention by the two step process. Electrode Sample C was prepared by pre-depositing the zinc-oxide/zinc-hydroxide additive as taught in the present invention and described above. The sample was polarized at 0.011 amperes per square centimeter for 60 minutes in a solution of 0.06 molar zinc-nitrate, maintained at 90° C. The pH of the additive impregnation bath was maintained between 1.8 and 2.2 by the addition of 3.0 molar sodium-nitrite. The sample was rinsed with deionized water, dried and weighed. 0.4995 grams of additive material was deposited on the electrode substrate. This sample was then subjected to a standard electrochemical impregnation process to introduce the nickel-hydroxide active material into the electrode substrate. The additive treated electrode substrate was immersed in a solution containing 1.8 molar nickel-nitrate and 0.12 molar cobalt-nitrate, buffered with 3.0 molar sodium-nitrite. The electrode was polarized at a current density of 0.05 Amperes per square centimeter for 90 minutes. The nickel-nitrate impregnation bath was maintained at 90° C. throughout the process. The impregnation bath pH was maintained between 2.3 and 3.3 by the addition of 3.0 molar sodium-nitrite buffer solution. Nickel-hydroxide active material was electrochemically deposited into the electrode substrate for a total weight gain of 22.8875 grams of active material total (including the 0.4995 grams of additive material previously deposited). The electrode was subsequently tested in 31% aqueous potassium-hydroxide to obtain the electrochemical utilization data presented in the Table.

TABLE

|  | A | B | C |
| --- | --- | --- | --- |
| Area (cm$^2$) | 175.4 | 175.4 | 175.4 |
| Thickness (cm) | 0.0711 | 0.0815 | 0.0869 |
| Substrate weight (g) | 27.6398 | 27.6398 | 27.4446 |
| Wire weight (g) | 6.525 | 6.525 | 6.525 |
| Initial thickness average (in.) | 0.0282 | 0.0321 | 0.0342 |
| Final thickness average (in.) | 0.0300 | 0.0351 | 0.0355 |
| Total thickness increase | 0.0018 | 0.0030 | 0.0013 |
| Total thickness increase (%) | 6.382 | 9.190 | 3.801 |
| Weight Zinc (g) | N/A | 0.4623 | 0.4995 |
| Zinc % Active Material (%) | N/A | 2.31 | 2.18 |
| Finished pick-up (g) | 19.7727 | 20.0152 | 22.8875 |
| Finished weight (g) | 47.4125 | 47.6550 | 50.3321 |
| Utilization (%) | 99.9616 | 89.3784 | 112.8261 |
| Active mass (%) | 41.70 | 42.00 | 45.47 |
| Inactive mass (%) | 58.30 | 58.00 | 54.53 |
| Specific Energy (mAh/g) | 120.48 | 108.49 | 145.04 |
| Energy Density (mAh/cc) | 427.30 | 331.02 | 461.47 |

Column C exhibits enhanced active material utilization as compared to both Columns A and B. Active material electrochemical utilization is calculated based on the theoretical electrochemical capacity of the active material. The theoretical capacity is calculated as the weight of active material in grams multiplied by 0.289 Ampere-hours per gram. This number assumes a one electron reaction as indication in reaction (7).

$$Ni(OH)_2 + OH^- \leftrightarrow Ni(OOH) + H_2O + e \tag{7}$$

By way of comparison to the prior art, Column A utilizes approximately 100% by weight of the active material deposited. If zinc additive is co-deposited with the nickel-hydroxide active material, the electrochemical utilization decreases to approximately 90%. This is a 10% loss in usable capacity of the electrode which results in a lower specific energy (milliAmpere-hours per gram of electrode). Column A delivers about 120 mAh/g which is typical for a traditional aerospace quality electrode. The decreased utilization caused by the co-deposition of the zinc additive results in an electrode with only 108 mAh/g. This is a significant decrease in specific energy. This means that more nickel electrode material is required to deliver the same capacity, which results in an increase in battery weight. This weight increase has an adverse effect in most battery applications including aerospace, military and commercial applications for consumer and man-portable battery powered devices and equipment. The decrease in specific energy and the corresponding increase in battery weight is a trade-off in order to obtain the longer cycle life provided by the performance enhancing zinc additive.

The present invention, as demonstrated by the sample of Column C, allows the realization of the benefits of the performance enhancing zinc additive without incurring a corresponding penalty of increasing the battery weight. If the zinc additive is pre-deposited in a separate step as taught by the present invention, the undesirable result of decreased active material utilization and increased battery weight is avoided as the results for Column C in the Table so illustrate. Column C shows a significant increase in active material utilization and a corresponding increase in the specific energy of the electrode. The active material utilization by weight increases to 112%. This higher active material utilization is interpreted as the result of the interaction of the high surface area, thin-film structure of zinc additive introduced into the electrode, as opposed to the bulk zinc doping effect obtained by co-deposition. An active material utilization of greater than 100% is interpreted as a higher average oxidation state for the nickel-hydroxide. In effect, slightly more than one electron is exchanged for the electrode reaction. This is also the effect of the thin-film additive structure which improves the electronic efficiency of the nickel-hydroxide active material.

The bottom line is specific energy, which is the quantity of energy delivered by the electrode per unit weight. A larger specific energy corresponds to a lighter-weight battery.

Column C delivers a specific energy of 145 milliAmpere-hours per gram of electrode. This is a 20% increase over the current aerospace quality electrode (Column A) and a 34% increase over the electrode prepared by the co-deposition process (Column B).

The reason for incorporating zinc into the nickel electrode is to reduce electrode swelling and therefore increase battery cycle life performance. When the nickel-hydroxide active material is deposited into the porous electrode substrate, expansion (swelling) of the substrate occurs. Nickel-hydroxide has a much lower density than nickel metal and thus occupies a larger volume. As shown in the Table, Column A swells about 6% during this process and the co-deposited electrode, Column B, swells about 9%, based on original thickness. Column C, prepared by the pre-deposition method of the present invention, swells only 3% of its original thickness. This is also attributed to the unique thin-film structure of the additive material obtain by the present invention.

In addition to initial swelling, long-term swelling during electrical cycling in the battery can also be a problem and a life limiting factor in the battery. A sample electrode, prepared by the teaching of the present invention as Column C above, was electrically charge/discharge cycled for 200 cycles at high rate to measure the swelling of the electrode. In this accelerated life test, the electrode was charged to 200% of its theoretical capacity at a charge rate equivalent to 10 times the theoretical capacity. The electrode was also 100% fully discharged each cycle. These conditions were chosen to achieve an abnormally harsh environment in which to test the electrode sample. Excessive overcharge was selected because this favors the formation of γ-phase nickel-hydroxide active material which increases electrode swelling. High charge current also favors the formation of γ-phase nickel-hydroxide due to reduced charge efficiency at higher rates and excessive oxygen evolution on the electrode. High depth-of-discharge also promotes electrode swelling and maximizes electrode stress. These conditions provide a worst case test for electrode swelling. The electrode sample prepared according to the process of the present invention increased in thickness 0.0024 centimeters during this 200 cycle test. An identical electrode without the zinc additive, prepared as Column A above, increased in thickness 0.0127 centimeters under identical test conditions. Therefore, electrode swelling was decreased by more than 80% through the application of the present invention. This corresponds to a significant increase in electrode performance and subsequent battery cycle life.

From the above disclosure of the general process of the present invention and the summary of the preferred embodiment, those skilled in the art will comprehend the various modifications to which the present invention is susceptible. Therefore, I desire to be limited only by the scope of the following claims and equivalents thereof.

We claim:

1. A process of forming a nickel electrode on a porous electrode substrate, comprising the steps of:
   electrodepositing a zinc compound selected from the group consisting of zinc-oxide and zinc-hydroxide and mixtures thereof onto said substrate; and
   subsequently electrochemically depositing a nickel-hydroxide active material onto said substrate.

2. The process of claim 1, wherein said electrode substrate is selected from the group consisting of sintered nickel powder, nickel fiber, nickel foam, graphite fiber, composite carbon material, metal coated graphite fibers, and metal coated polymer fibers.

3. The process of claim 1, wherein said zinc compound is deposited onto said substrate by immersing said substrate in a bath of one of a zinc nitrate or zinc sulfate solution and applying a current through said substrate.

4. The process of claim 3, wherein said bath contains about 0.04 to 0.10 molar solution of zinc nitrate.

5. The process of claim 3, wherein said substrate is polarized with a current density of about 0.0005 to 0.002 amperes per square centimeter.

6. The process of claim 5, wherein said substrate is further polarized by applying a current density of about 0.005 to 0.02 amperes per square centimeter.

7. The process of claim 3, wherein said bath is buffered with about a 1.0 molar solution of sodium nitrite.

8. The process of claim 7, wherein said bath is maintained at a pH of about 1.8 to 2.2.

9. The process of claim 7 wherein said bath is maintained at a temperature of about 80–95° C.

10. The process claimed in claim 1 wherein said nickel-hydroxide active material is deposited in combination with a cobalt compound selected from the group consisting of cobalt oxide, cobalt hydroxide and mixtures thereof.

11. A process of forming a nickel electrode on a porous electrode substrate selected from the group consisting of sintered nickel powder, nickel fiber, nickel foam, graphite fiber, composite carbon material, metal coated graphite fibers, and metal coated polymer fibers comprising the steps of;
   immersing said substrate in a first bath of a zinc-salt solution;
   applying a current to said substrate to deposit one of zinc-oxide, zinc-hydroxide or mixtures thereof onto said substrate;
   immersing said substrate in an active material bath of a nickel-salt solution, said bath provided with at least one counter-electrode; and
   applying a current to said substrate thereby depositing nickel-hydroxide active material onto said substrate.

12. A process of forming a nickel electrode on an electrode substrate, comprising the steps of:
   immersing said substrate in an additive bath of about 0.04 to 0.10 molar solution of one of zinc-nitrite or zinc sulfate;
   applying a first current density to said substrate during said additive immersing step;
   polarizing said substrate with a second current density of about 0.005 to 0.02 amperes per square centimeter;
   buffering said additive bath with a molar solution of sodium nitrite;
   electrochemically depositing one of a zinc-oxide, zinc-hydroxide or mixture thereof onto said substrate;
   drying said substrate at about 60° C.; and thereafter
   electrochemically depositing one of a nickel oxide or nickel hydroxide active material onto said substrate.

* * * * *